Nov. 21, 1950     B. E. ROBINSON     2,531,158
MEAT CHOPPING DEVICE WITH WORM GEAR DRIVING MEANS
Filed Feb. 26, 1945     4 Sheets-Sheet 1
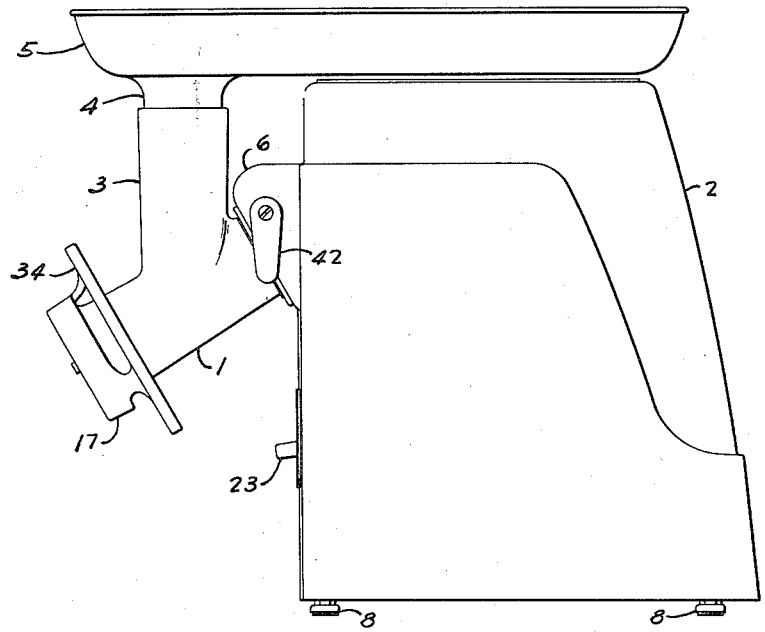
Fig. I
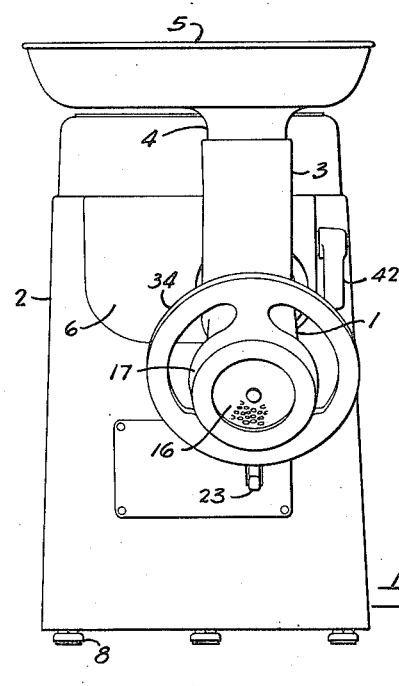
Fig. II
INVENTOR.
Bruce E. Robinson
BY
Marshall & Marshall
ATTORNEYS Nov. 21, 1950         B. E. ROBINSON         2,531,158
MEAT CHOPPING DEVICE WITH WORM GEAR DRIVING MEANS
Filed Feb. 26, 1945                          4 Sheets-Sheet 2
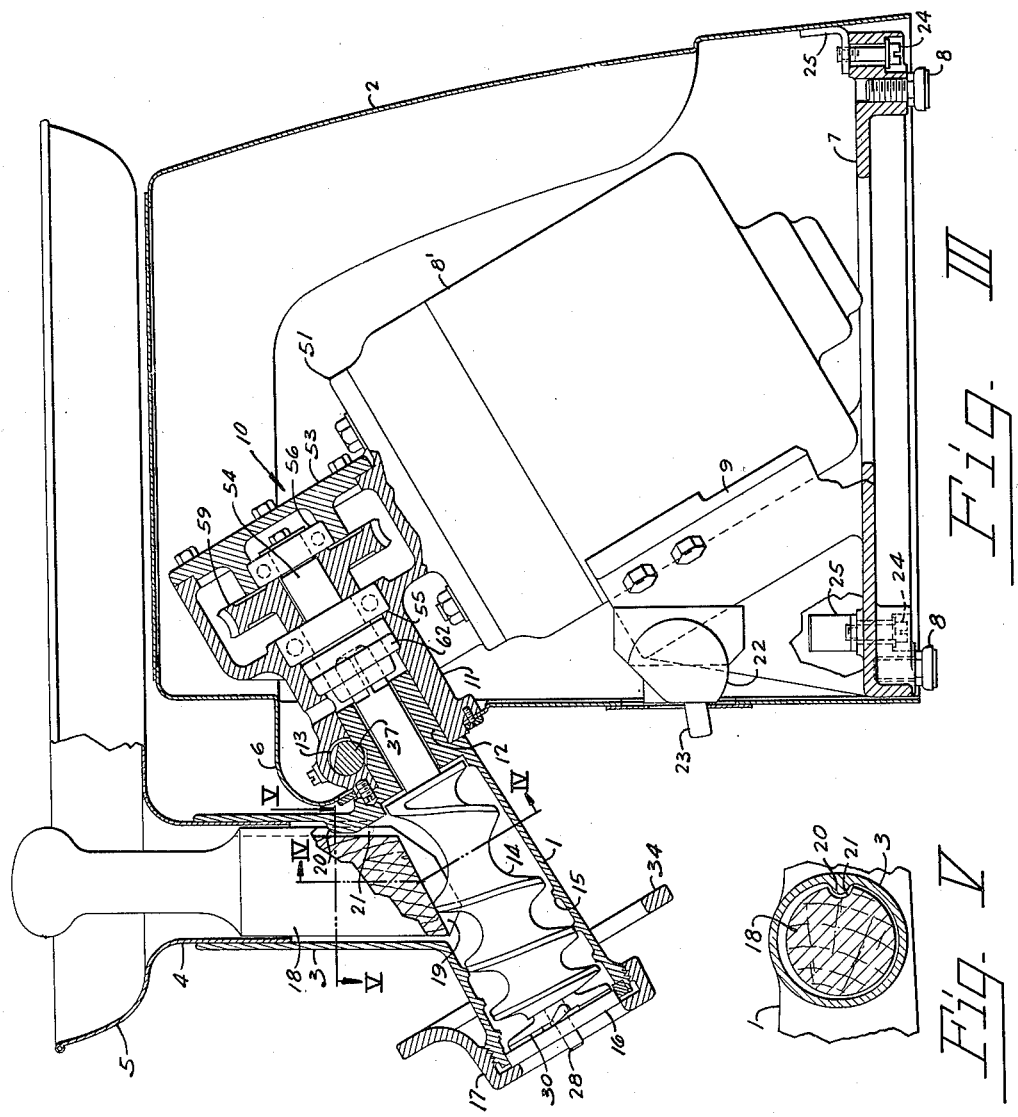
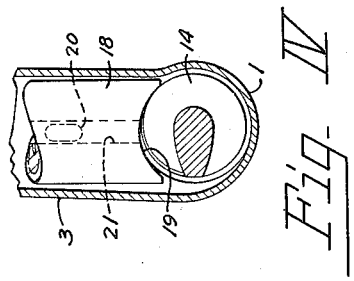
INVENTOR.
Bruce E. Robinson
BY
Marshall *and* Marshall
ATTORNEYS

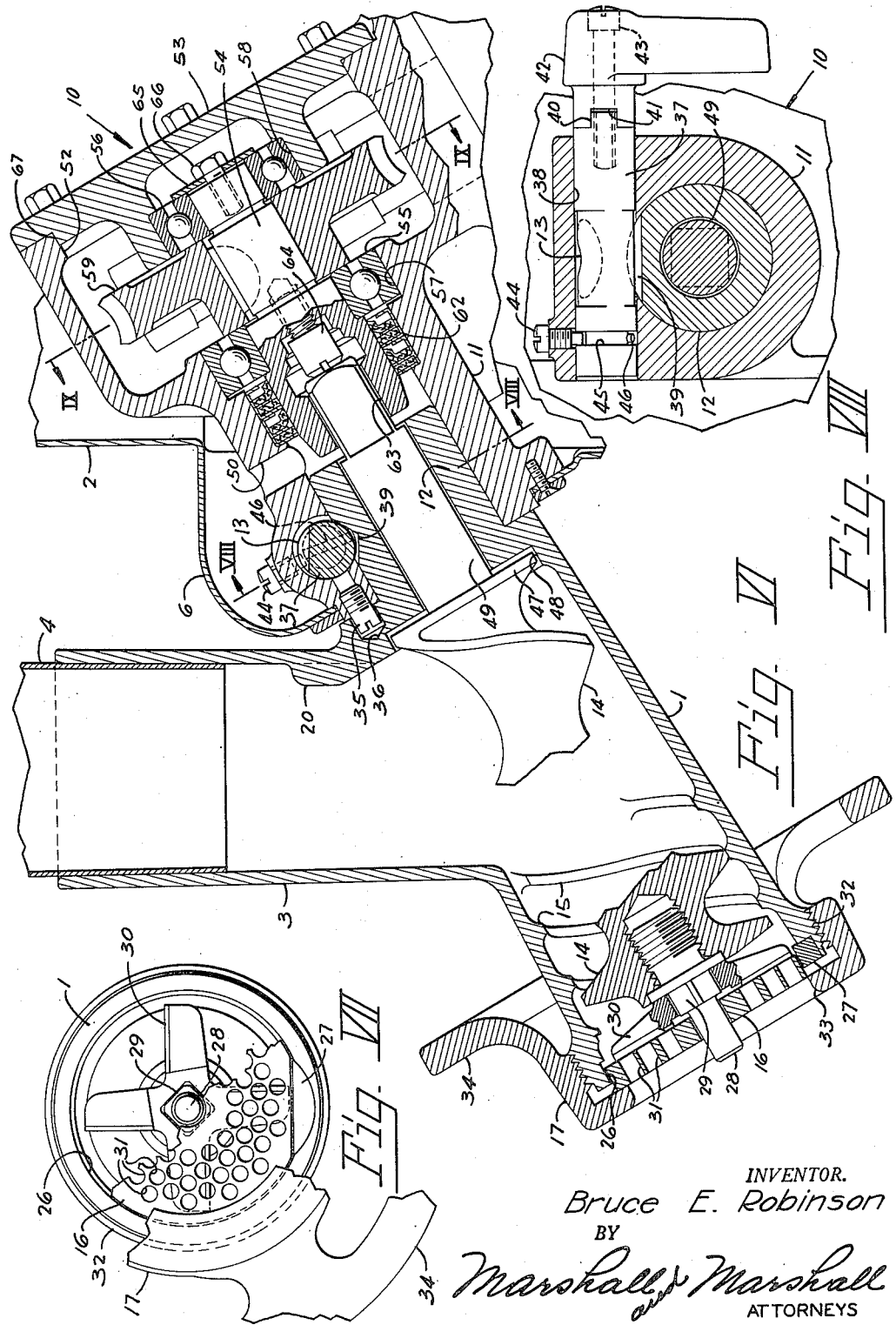

Nov. 21, 1950     B. E. ROBINSON     2,531,158
MEAT CHOPPING DEVICE WITH WORM GEAR DRIVING MEANS
Filed Feb. 26, 1945     4 Sheets-Sheet 4
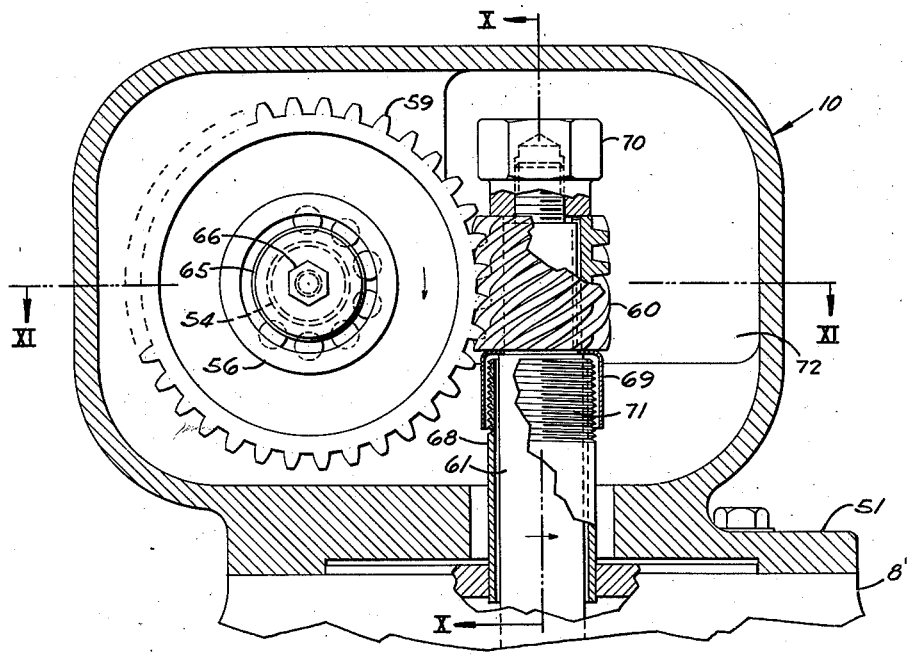
Fig. IX
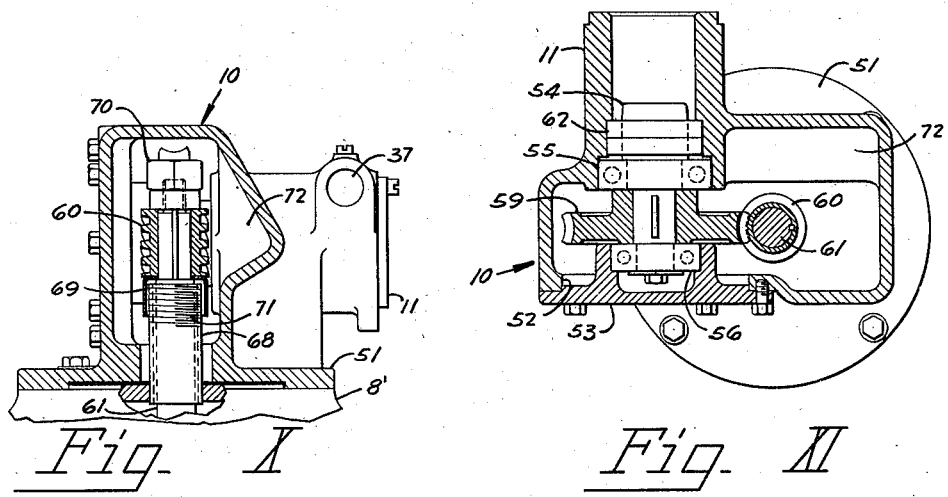
Fig. X     Fig. XI
INVENTOR.
Bruce E. Robinson
BY
Marshall & Marshall
ATTORNEYS Patented Nov. 21, 1950

2,531,158

UNITED STATES PATENT OFFICE 2,531,158

MEAT CHOPPING DEVICE WITH WORM-GEAR DRIVING MEANS

Bruce E. Robinson, Toledo, Ohio, assignor to Toledo Scale Company, Toledo, Ohio, a corporation of New Jersey Application February 26, 1945, Serial No. 579,729

3 Claims. (Cl. 146—182)

This invention relates to improvements in meat chopping machines of the type commonly used in retail meat markets, restaurants and hotels. In particular, it is concerned with improvements in the power transmission mechanism between the driving motor and the chopping mechanism.

Many meat choppers have been designed and manufactured for use in retail meat markets but it is customary to build them with the driving motor and the chopper cylinder substantially in line and connected with a gear drive employing spur gears. Such machines are quite bulky and also are quite difficult to service. One of the difficulties is maintaining adequate lubrication for the spur gears without losing the lubricating medium into the motor or into the chopper.

The principal object of the present invention is to provide a gear housing and drive system for a meat chopper, which drive system is easy to manufacture and service.

Another object is to provide in a meat chopper a drive housing in which the lubricating medium is effectively retained in the housing regardless of the positions through which it may be turned during handling.

These and other objects and advantages are attained by using a worm and worm gear drive between the motor and the feeding screw of the chopper and enclosing the gear mechanism in a simple housing attached to the upper end of the motor. The motor shaft carrying the worm extends upwardly through a fixed sleeve into the center of the interior of the housing. The fixed sleeve terminates just below the worm and being at a point above the normal level of oil in the housing prevents the oil from running into the motor. The housing is provided with a transverse sleeve located at substantially right angles to the motor shaft and offset therefrom. The chopper drive shaft carrying a worm wheel meshing with the worm is journaled coaxial with the transverse sleeve. The housing is so shaped and hollowed out that regardless of how it is positioned or turned the end of the sleeve surrounding the motor shaft will always be above the oil level. Thus the only oil seal required is that surrounding the output shaft and this is subject to very little wear because of the relatively low speed of operation of this shaft.

An example of a meat chopper employing the improved gear drive and housing is illustrated in the accompanying drawings.

In the drawings:

Figure I is a side elevation of a meat chopper embodying the invention.

Figure II is an end elevation showing the relationship of the chopper cylinder to the machine housing.

Figure III is a side elevation, partly in section, showing the general arrangement and cooperation of the elements of the meat chopper shown in Figure I.

Figure IV is a fragmentary sectional view taken substantially along the line IV—IV of Figure III.

Figure V is a horizontal section through the feeding hopper of the chopper as seen from the line V—V of Figure III.

Figure VI is a vertical enlarged section showing the drive mechanism and the chopper feed screw in detail.

Figure VII is a fragmentary end view with parts broken away of the discharge end of the chopper.

Figure VIII is a fragmentary cross section taken along the line VIII—VIII of Figure VI and showing the means employed to hold the chopper cylinder in the drive housing.

Figure IX is a fragmentary section taken substantially along the line IX—IX of Figure VI.

Figure X is a sectional view through part of the drive housing taken along the line X—X of Figure IX.

Figure XI is a sectional view taken perpendicular to the motor shaft and through the housing along the line XI—XI of Figure IX.

These specific figures and the accompanying description are intended to merely illustrate but not define the invention.

The meat chopper used to illustrate the invention comprises a chopper cylinder 1 which is supported and driven by mechanism enclosed within a cover 2. The chopper cylinder 1 is provided with an upwardly directed cylindrical feeding hopper 3 into whose upper end a downwardly extending neck 4 of a feeding tray 5 is fitted. The feeding tray 5 supported solely from the feeding hopper 3 extends over both the chopper cylinder 1 and the housing 2. The feeding tray 5 may be easily removed by merely lifting it off of the hopper 3. As may be seen in Figure I the chopper cylinder 1 is inclined downwardly away from the housing 2 while the feeding hopper 3 extends vertically. To accommodate the angular position of the chopper cylinder 1 the housing 2 is provided with a bulge or forwardly extending housing projection 6 adapted to enclose that end of the drive mechanism which supports the chopper cylinder.

The general arrangement of the chopper mechanism is shown in Figure III. The chopper is supported from a base 7 provided with adjustable feet 8 which permit it to be leveled and thus take care of minor counter irregularities. An electric motor 8' carried on an upwardly inclined bracket 9 of the base 7 is provided at its upper end with a gear housing 10. The housing 10 has a generally cylindrical sleeve 11 extending substantially perpendicular to but offset from the axis of the motor 8'. A cylindrical tenon 12 of the chopper cylinder 1 fits into the cylindrical sleeve 11 and is locked therein by a cam 13.

Products to be chopped are fed from the tray 5 through the feeding hopper 3 and are driven by a feed screw 14 cooperating with spiral ribs 15 against a perforated plate 16 held against the end of the chopper cylinder 1 by a threaded retaining ring 17. When chopping a material which has already been coarsely chopped, pressure is required to assist the feeding screw 14. This pressure is provided by a manually operated plunger 18 which is a close fit in the feeding hopper 3. The lower end 19 of the plunger 18 is beveled to correspond to the angle between the chopper cylinder 1 and the feeding hopper 3. It is also hollowed out to conform to the periphery of the feed screw 14 so that it will effectively force the material to be chopped into the feeding spaces of the screw. Because of the nonsymmetric nature of the plunger end 19 an inwardly directed key 20 cast in one wall of the hopper 3 and adapted to cooperate with a longitudinal groove 21 cut in the side of the plunger 18 is provided to prevent rotation of the plunger 18 and the resulting interference between the plunger and the feed screw. These details are illustrated in Figures IV and V.

For the convenience of the operator in controlling the motor 8' an electrical switch 22 is provided. This switch is mounted on the bracket 9 of the base 7 in such position that its handle 23 projects through the wall of the housing 2 in the space beneath the chopper cylinder 1. This location protects the switch from accidental operation or injury and yet is in a convenient location for the operator's use.

The housing 2 is secured to the base 7 by a set of screws 24 extending upwardly through the base 7 and threaded into ears 25 welded to the sides of the housing 2. This type of construction permits assembly without leaving any broken surfaces or projecting screw heads on the exterior of the housing. The elimination of all breaks or crevices in the exterior of the housing materially simplifies the cleaning of the housing as well as improving its appearance.

The chopper cylinder 1 and the feeding screw 14 are shown in more detail in Figure VI. The discharge end of the chopper cylinder 1 is provided with an annular shallow counterbore 26 to accommodate the perforated plate 16. The perforated plate is prevented from rotating by a flat segmental key 27 brazed into a recess cut in the periphery of the counterbored hole 26, the perforated plate being provided with a flat on one edge to match the key 27.

A short arbor 28 screwed into the end of the feed screw 14 has a square cross-section portion 29 which drives a four-bladed knife 30. Blades of the knife 30 sweep over perforations 31 of the plate 16 to sever the nodules of meat forced into the perforations by pressure developed by the feed screw 14. The retaining ring 17 threaded onto an exteriorly threaded portion 32 of the chopper cylinder 1 is provided with an inwardly directed rim 33 which holds the perforated plate 16 against the pressure of the knife 30. It is also provided with a hand ring or handle 34 to facilitate its adjustment or removal.

As was mentioned previously the chopper cylinder 1 has a tenon 12 engageable within the cylindrical sleeve 11 of the housing 10 and is locked therein by the cam 13. A pilot screw 35 threaded into the face of the sleeve 11 extends into a hole 36 in the adjacent face of the chopper body 1 to guide the chopper body into proper position with respect to the housing 10. The cam 13 is an eccentric portion of a locking bar 37 which is fitted into a hole 38 drilled transversely through bosses on the upper side of the cylindrical sleeve 11. The hole 38 is offset so as to only partially intersect the longitudinal bore of the sleeve 11. In addition, the locking bar 37 has a relieved or concave portion cut away from one side so that when it is turned to one position it does not interfere with the bore within the sleeve 11 and thus allows the insertion or withdrawal of the tenon 12 of the chopper cylinder 1. When it is turned clockwise toward the position shown in Figure VI its eccentric portion 13 engages a side of a shallow transverse V notch 39 cut in the tenon 12. Because the locking bar 37 is turning clockwise the frictional forces between the cam portion 13 and the notch 39 is in such direction as to seat the tenon 12 firmly in position in the housing 10. One end of the locking bar 37 is provided with a transverse key 40 fitted into a transverse keyway 41 cut in the end of the shaft portion of a handle 42. A screw 43 inserted through a hole in the handle 42 and threaded into the end of the locking bar 37 secures the handle in position. Axial movement of the locking bar 37 is prevented by a cylindrically tipped screw 44 engaged in a peripheral groove 45 of the locking bar 37. A transverse pin 46 is inserted in the base of the annular groove 45 in position to contact the cylindrical end of the screw 44 when the locking bar 37 is turned to the unlocked position. This eccentric type of lock provides a simple economical way of locking the parts together and yet has sufficient strength to withstand the separating forces generated by the feed screw.

In most choppers the thrust of the feed screw is carried on a fiber washer inserted between the end of the starting end of the feed screw and the adjacent surface of the chopper cylinder. With that type construction there is little or no force tending to separate the chopper cylinder from the drive. In contrast to this the chopper cylinder illustrated in the drawings is so constructed that the end thrust of the feed screw is transmitted through the drive shaft to a thrust bearing in the drive housing. This permits a flange 47 defining the starting end of the feed screw to be loosely fitted within a counterbore 48 of the chopper cylinder 1. Likewise, the feed screw shaft 49 is loosely fitted within the cylindrical tenon 12. The looseness of these fits permits air to circulate from the interior of the chopper cylinder 1 through the radial and axial clearances between the flange 47 and the bottom of the counterbore 48 and along the shaft 49 to the interior of the cylindrical sleeve 11 which is provided with a vent 50 leading to the atmosphere. This air passage prevents the formation of a vacuum beneath the lower end 19 of the plunger 18 when coarsely comminuted material is being chopped a second time. Without this provision the coarsely comminuted material tends to seal the space around the plunger and thus by the formation of a vacuum prevents its easy operation. The clearance between the flange 47 and the counterbore 48 while allowing a free passage of air is small enough so that meat particles can not penetrate it to an appreciable degree.

The housing 10 surmounting the motor 8' and provided with a cylindrical sleeve 11 accommodating the chopper cylinder 1 is a box-like structure erected from a circular base 51 piloted on and bolted to the end of the motor 8'. The cylindrical sleeve 11 projects laterally from one side near one end of the box-like structure while the opposite wall has a circular access opening 52 concentric with the sleeve 11. The access opening is closed by a circular cover plate 53. A drive shaft 54 is journaled in the housing 10 concentric with the cylindrical sleeve 11. This shaft is supported on ball bearings 55 and 56. The ball bearing 55 designed to carry radial load is supported in a bore 57 of the housing 10 and is allowed a small amount of axial freedom therein. The ball bearing 56 supporting the end of the shaft 54 is of the combination radial thrust type and is carried in a bore 58 cut in an inwardly directed boss of the circular cover 53. Between the bearings 55 and 56 the shaft 54 carries a worm wheel 59 which meshes with a worm 60 keyed to a shaft 61 extending upwardly from the armature of the motor 8. The worm wheel 59 is keyed to the shaft 54 to provide a positive drive. Lubricating oil from within the housing 10 is prevented from flowing past the ball bearing 55 and down the cylindrical sleeve 11 by oil retainers 62. The end of the drive shaft 54 is tapered to allow its easy insertion through the oil retainers 62. The tapered end of the drive shaft 54 is provided with a square socket 63 adapted to receive a squared end of the feed screw shaft 49. The bottom of the square socket 63 is fitted with a flat headed screw 64 which is used to secure axial adjustment of the feed screw shaft with respect to the drive shaft 54. Inasmuch as the chopper cylinder 1 is always fully seated within the cylindrical sleeve 11 the screw 64 allows the axial clearance between the flange 47 of the feed screw 14 and the bottom of the counterbore 48 to be adjusted to any desirable dimension. The thrust of the knives 30 against the perforated plate 16 which is transmitted through the feed screw 14 is carried by the thrust bearing 56 supporting the far end of the drive shaft 54. By thus eliminating as many bearings as possible the points of wear have been materially reduced thus increasing the serviceable life of the machine.

It is difficult to keep a removable element such as a chopper cylinder accurately aligned with a drive housing. This difficulty is overcome by providing only one bearing in the chopper cylinder for the feed screw and that bearing is in the perforated plate. The other end of the feed screw is carried in the socket in the drive shaft. The only effect of a misalignment is a slight oscillation in the socket which can neither affect the operation of the chopper nor increase the wear of the various parts.

The drive shaft 54 and its bearings 55 and 56 are of such dimensions that the bearings and the worm wheel 59 may be slipped on the shaft and anchored by a washer 65 held in place by a cap screw 66 threaded into the end of the shaft 54. This assembly is then pushed into position in the housing with the end of the shaft 54 inserted through the oil seals 62 and the cover 53 is put in place. The depth of the counterbore 58 is made much greater than the depth of a flange 67 piloting the cover 53 into the access opening 52 so that the bearing 56 may be entered in its receiving bore before the cover must be guided into its final position.

A sleeve 68 is pressed into the end of the motor 8 so that it surrounds the armature shaft 61 and extends well into the interior of the housing 10. The armature shaft 61 is machined with a shoulder slightly above the upper end of the sleeve 68 so that a cup 69 may be dropped over the end of the armature shaft 61 and secured against the shoulder on the shaft when the worm 60 is tightened into place by a cap nut 70 screwed onto the end of the armature shaft. The upper end of the sleeve 68 is provided with helical threads 71 which are cut in such direction that the rotation of the armature shaft 61 and the cup 69 tends to feed any oil down out of the cup and into the housing thus preventing any creepage of oil around the end of the sleeve 68 and into the motor.

The housing 10 is provided with vacant space surrounding the worm 60 particularly on the side opposite the worm wheel 59. This is done so that the worm 60 will be located substantially at the center of the air space within the housing 10. The sleeve 68 extends almost to the worm 60. The normal oil level in the housing is below the end of the tube 68. Therefore, regardless of how the machine or housing may be tipped, whether it be right side up or up side down, the end of the tube 68 will be above the oil level and there is no danger of oil leaking into the motor. This distribution of air space is indicated in Figures X and XI taken with Figure IX. Thus in Figure IX, although the armature shaft 61 is apparently offset toward the right, yet the volume occupied by the worm wheel 59 brings the center of the air space over to the armature shaft. When the cylindrical sleeve is directed downwardly there would be danger of oil flow into the sleeve if the housing were not provided with a pocket 72 to take the excess oil.

This particular arrangement of parts for the drive of a chopper thus affords the advantages of compactness, reduced wear of the chopper parts (thrust is taken by a ball bearing instead of a fiber washer), simplified oil sealing in that only the output shaft need be provided with an oil seal, and easy maintenance and manufacture in that all the machined surfaces in the housing are concentric with the drive shaft and machineable from one side of the housing and in that the drive shaft assembly may be removed or installed as a unit.

Having described the invention, I claim:

1. In a chopper for comminuting meat or other products, an inclined motor and an oil retaining drive housing for the driving mechanism between the motor and a feed screw in a chopper cylinder, said housing comprising a base concentric with the armature shaft of the motor and supported by the upper end of the motor, an enclosure including a pair of parallelly opposed walls erected from said base, a generally cylindrical sleeve extending from one of said opposed walls, the other of said walls having an access opening coaxial with said sleeve, a cover for said opening, means in said sleeve and said cover for journaling a drive shaft with a worm wheel on the drive shaft engaged with a worm on the armature shaft, and a tubular sleeve slipped over the armature shaft and pressed into the frame of the motor, said housing being proportioned so that the center of its volume substantially coincides with the end of said tubular sleeve.

2. In a chopper for comminuting meat or other products, in combination, a driving motor, a gear housing attached to said motor and supporting a chopper cylinder, a drive shaft journaled in said housing and driven by said motor, said drive shaft being provided with a socket to drivingly receive the end of a feed screw shaft and to provide radial and axial support therefor, and a screw tapped into the bottom of the socket in said drive shaft for adjusting said feed screw axially with respect to said drive shaft.

3. In a chopper for comminuting meat and other products, in combination, an inclined drive motor, a gear housing attached to the upper end of the drive motor and enclosing an end of the shaft of the motor, gearing within the housing for connecting the motor shaft to an output shaft, and a sleeve fixed in the frame of the motor and extending into the housing substantially to the portion of the gearing mounted on the shaft, said housing having recesses for accommodating lubricating fluid, the recesses being disposed with respect to the sleeve and gearing such that for all positions of the housing the end of the sleeve in the housing is above the level of the lubricating fluid.

BRUCE E. ROBINSON.

REFERENCES CITED

The following references are of record in the file of this patent:

UNITED STATES PATENTS

| Number | Name | Date |
| --- | --- | --- |
| 1,210,251 | Young | Dec. 26, 1916 |
| 1,457,910 | Loichot | June 5, 1923 |
| 1,484,525 | Noeggerath | Feb. 19, 1924 |
| 1,618,990 | Metters et al. | Mar. 1, 1927 |
| 1,780,914 | Gullberg | Nov. 11, 1930 |
| 1,898,945 | Fitzgerald | Feb. 21, 1933 |
| 2,038,731 | Gunderson | Apr. 28, 1936 |
| 2,122,085 | Castricone | June 28, 1938 |
| 2,143,202 | Martinet | Jan. 10, 1939 |